United States Patent
Lanaro

(10) Patent No.: US 11,815,743 B2
(45) Date of Patent: Nov. 14, 2023

(54) HINGED SPECTACLE FRAME

(71) Applicant: M Group S.à r.l., Luxembourg (LU)

(72) Inventor: Alessandro Lanaro, Luxembourg (LU)

(73) Assignee: M Group S.à r.l., Luxembourg (LU)

( * ) Notice: Subject to any disclaimer, the term of this patent is extended or adjusted under 35 U.S.C. 154(b) by 201 days.

(21) Appl. No.: 17/541,347

(22) Filed: Dec. 3, 2021

(65) Prior Publication Data

US 2022/0179235 A1 Jun. 9, 2022

(30) Foreign Application Priority Data

Dec. 4, 2020 (IT) ........................ 102020000030008

(51) Int. Cl.
*G02C 5/22* (2006.01)
(52) U.S. Cl.
CPC ....... *G02C 5/2209* (2013.01); *G02C 2200/04* (2013.01); *G02C 2200/32* (2013.01)
(58) Field of Classification Search
CPC .............. G02C 5/2209; G02C 2200/04; G02C 2200/32; E05D 7/1061; E05D 7/1077
(Continued)

(56) References Cited

U.S. PATENT DOCUMENTS 2,734,222 A * 2/1956 Kiba ..................... E05D 7/1077
16/257
2,765,488 A * 10/1956 Ruff ......................... E05D 1/06
16/262

(Continued)

FOREIGN PATENT DOCUMENTS

EP 0495767 P 7/1992
EP 2757406 7/2014
(Continued)

OTHER PUBLICATIONS

Search Report, Written Opinion dated Aug. 18, 2021; Application IT102020000030008; 13 pages.

*Primary Examiner* — George G. King
(74) *Attorney, Agent, or Firm* — Mark Bandy; Rankin Hill & Clark, LLP

(57) ABSTRACT

Spectacle frame (1) comprising: a front piece (10); a pair of temples (20), each temple (20) extending between a first end portion (21) associated with the front piece (10) and a second end portion (22) that can be positioned on the ear of a user; a pair of hinges (30) configured to rotationally bind each temple (20) to the front piece (10), each hinge (30) comprising: a pin (40) extended along a development direction (A-A) between a first end (40a) and a second end (40b), coupling devices (50) associated with the first end portion (21) of each temple (20) and configured to engage the corresponding pin (40); a cavity (60) located in the front piece (10), the cavity (60) comprising: a first wall (70) and an opposite second wall (80) spaced along a spacing direction (B-B); and blocking devices (90) configured to engage the ends (40a, 40b) of the pins (40), the blocking devices (90) being shaped to match the first end (40a) and the second end (40b) of the pin (40) to prevent the pin (40) from making rotational movements around the development axis (A-A) and translational movements with respect to the blocking devices (90) as a result of mutual engagement between the ends (40a, 40b) of the pin (40) with the blocking devices (90); the first end (40a) and the second end (40b) of the pin (40) are wedge-shaped.

10 Claims, 14 Drawing Sheets

(58) Field of Classification Search
USPC .......................................... 351/153; 16/228
See application file for complete search history.

(56) References Cited

U.S. PATENT DOCUMENTS

| | | | |
|---|---|---|---|
| 4,968,129 A | 11/1990 | Grendol | |
| 5,315,328 A * | 5/1994 | Hofmair | G02C 5/2209 351/153 |
| 8,029,133 B2 * | 10/2011 | Chen | G02C 5/146 351/153 |
| 2007/0172310 A1 * | 7/2007 | Yang | F16M 11/041 403/150 |
| 2010/0321629 A1 * | 12/2010 | Chen | G02C 5/2209 351/153 |
| 2014/0071396 A1 | 3/2014 | Kuo | |
| 2014/0285764 A1 | 9/2014 | Chen | |
| 2022/0091435 A1 * | 3/2022 | Williams | G02C 5/2209 |

FOREIGN PATENT DOCUMENTS

| | | | | |
|---|---|---|---|---|
| EP | 3547012 | | 10/2019 | |
| GB | 1431656 A | * | 4/1976 | E05D 7/1061 |

* cited by examiner

# HINGED SPECTACLE FRAME

TECHNICAL FIELD

The present invention relates to spectacle frames that are easy and quick to assemble. In particular, the invention relates to an improved screwless hinge.

STATE OF THE ART

It is known from the state of the art to rotatably connect the temples to a spectacle front piece by means of different types of hinges. These hinges, made of plastic and/or metal, comprise a pin and coupling elements associated with the front piece and the temples and mutually coupled, in order to allow the rotation of the temples with respect to the front piece. Among the different types of hinges, the most common involve gluing, screwing or fixing the coupling elements to the temples and the front piece. In this way, the pin makes it possible to connect the temples to the front piece rotatingly by coupling the coupling elements associated with the temples and those associated with the front piece. It should be noted that in these solutions, the pin provides a screw connection among the coupling elements so that it can be adjusted by a user.

Other known spectacle frames provide for the use of joining devices among the coupling elements, instead of a screw pin, to allow the temples to rotate with respect to the front piece. For example, document EP3143455 A1 describes a spectacle frame in which the joining devices comprise a hollow barrel body, associated with the temples, and a rotation core, associated with the front piece, which can be rotated relative to each other. In particular, the barrel body is notched in such a way that the core can be inserted inside it and an opening allows the direct connection between the core and a pair of tabs extending from the front piece. In this way, once the temples have been connected to the barrel body, they can rotate according to the angular extension of the opening.

Alternatively, other types of spectacle frames provide for the coupling elements to be directly coupled in a rotatable manner, shaping them in such a way as to define an interlock, as described in EP1743206 B1.

PROBLEMS OF THE PRIOR ART

Known hinges have several disadvantages related to the complexity of production and assembly/disassembly as well as the actual durability of the coupling between the temple and the spectacle front piece. In particular, hinges provided with a screw pin and corresponding coupling elements that can be fixed to the temples and to the front piece require long and complex production steps. In addition, the assembly of this type of hinges is complicated as it requires the use of precision tools and experienced personnel. It should also be noted that the use of screw pins and/or screw connections will eventually lead to loosening and wear in the long run, which will reduce the service life of the hinge and of the frame.

With regards to the hinges that do not use a screw coupling, they are rather complex. Therefore, also in this case, the large number of components required, their mutual coupling and their particular shapes necessitate high production costs. In fact, the production of this type of hinge requires complex manufacturing steps and lengthy assembly processes. In addition, it should be noted that the precision coupling among the various components reduces the reliability and durability of the hinge itself as possible collisions, misalignments among components and their deformations could easily block this type of hinge making it unusable.

OBJECT OF THE INVENTION

The object of the invention is to provide a spectacle frame capable of overcoming the above mentioned drawbacks of the prior art.

In particular, it is an object of the present invention to provide a simple screwless hinge capable of ensuring a robust and reliable coupling between the temples and the front piece of the spectacles and to simplify the mounting steps.

The defined technical task and the specified aims are substantially achieved by a spectacle frame comprising the technical characteristics set forth in one or more of the appended claims.

ADVANTAGES OF THE INVENTION

Advantageously, the spectacle frame of the present invention makes it possible to reduce production costs compared to the prior art.

Advantageously, the spectacle frame of the present invention has a high level of reliability due to the reduced number of components.

Advantageously, the spectacle frame of the present invention makes it possible to simplify the assembly steps.

BRIEF DESCRIPTION OF THE DRAWINGS

Further characteristics and advantages of the present invention will become more apparent from the approximate and thus non-limiting description of a preferred, but not exclusive, embodiment of a spectacle frame, as illustrated in the accompanying drawings, wherein.

DETAILED DESCRIPTION

Figure 1:
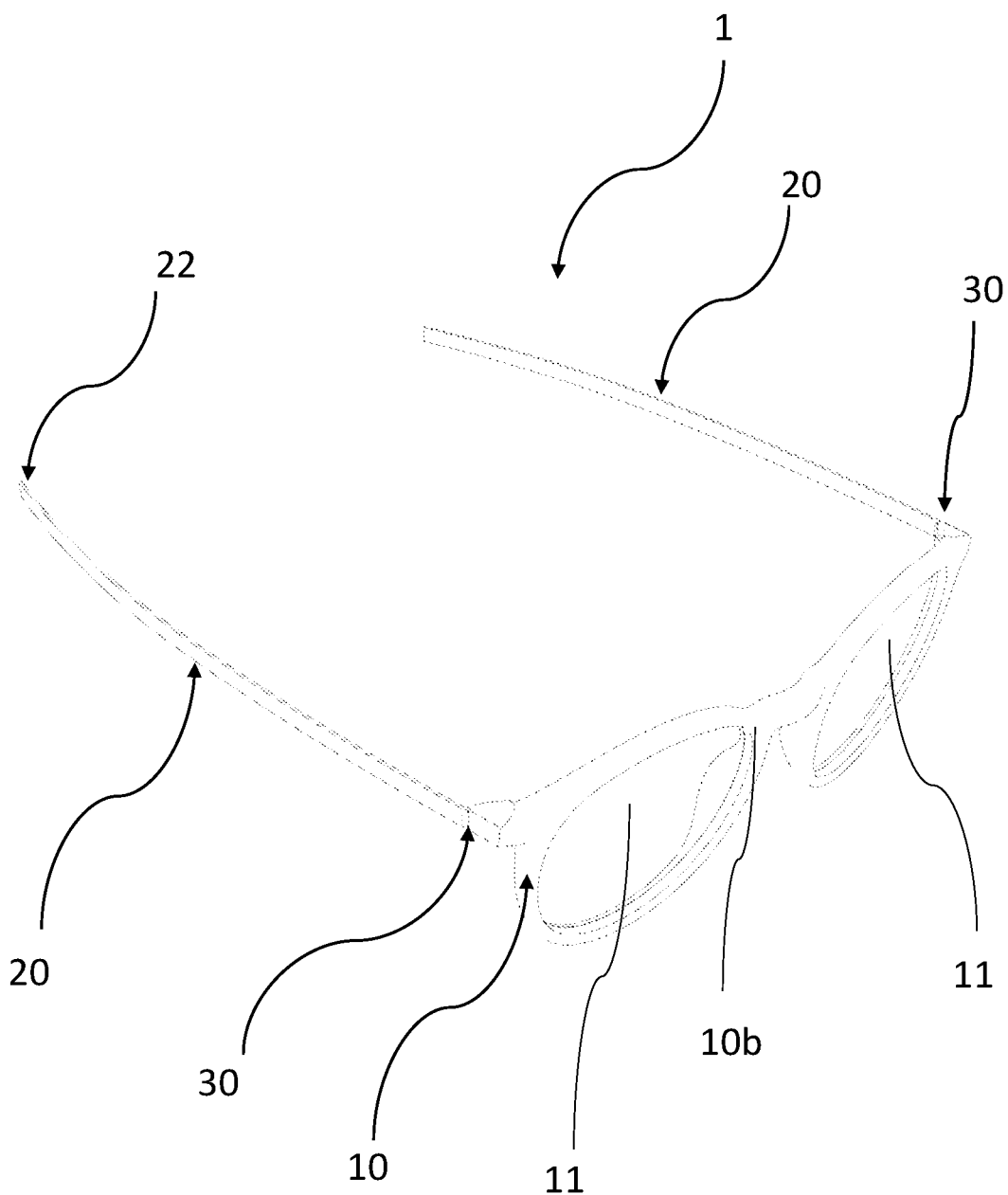
FIG. 1 shows a perspective view of the spectacle frame in accordance with a first embodiment of the present invention.
Figure 2:
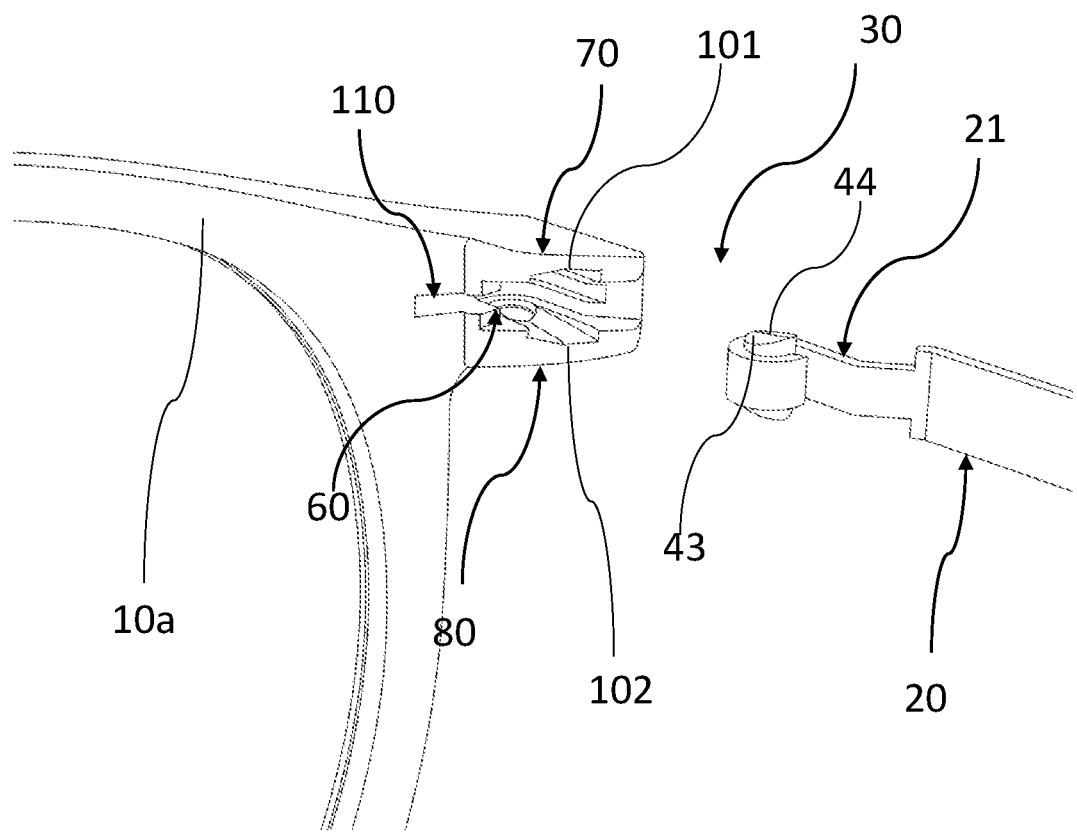
FIG. 2 shows a first perspective view of a portion of the spectacle frame partially assembled in accordance with the embodiment of FIG. 1.
Figure 3:
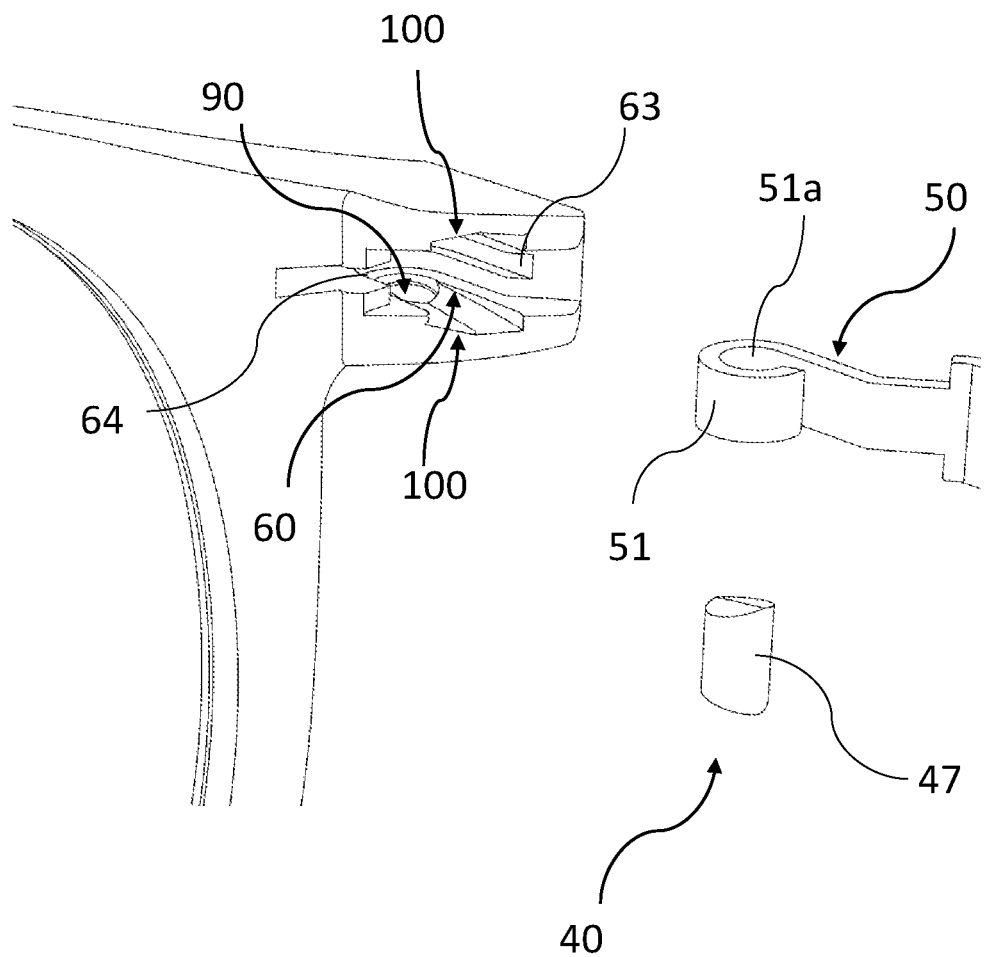
FIG. 3 shows a second perspective view of a portion of the spectacle frame partially assembled in accordance with the embodiment of FIG. 1.
Figure 4:
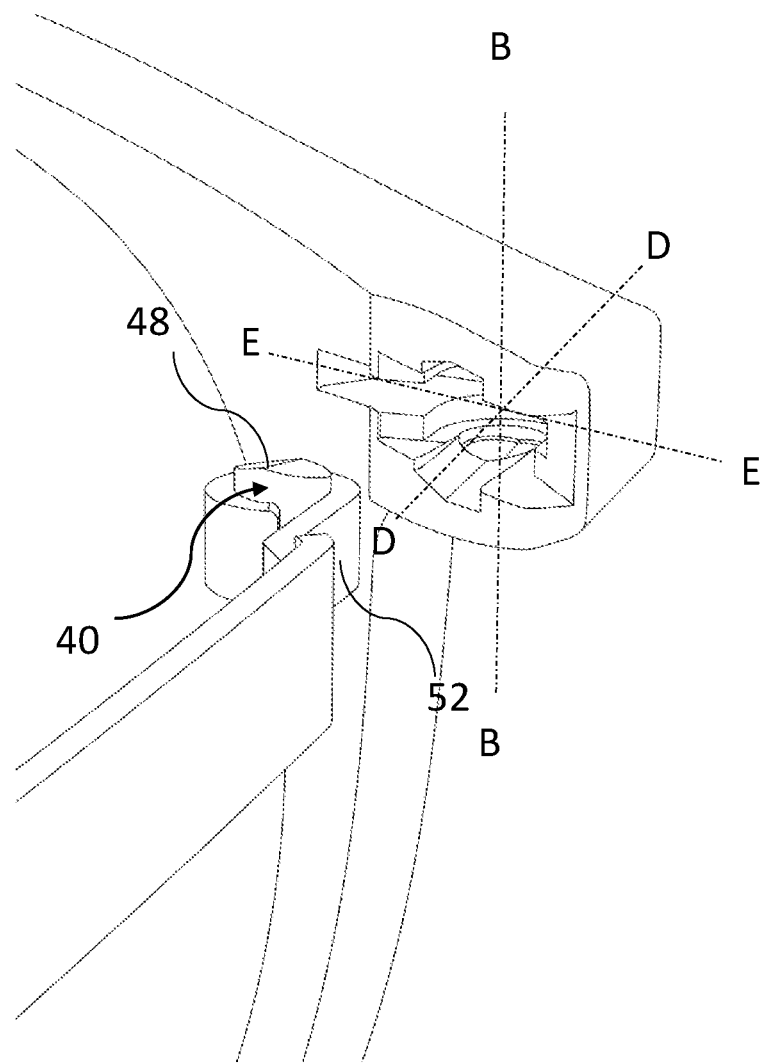
FIG. 4 shows a third perspective view of a portion of the spectacle frame partially assembled in accordance with the embodiment of FIG. 1.

Even when not explicitly highlighted, the individual features described with reference to the specific embodiments must be considered as accessories and/or exchangeable with other features, described with reference to other embodiments.

The present invention relates to a spectacle frame globally indicated with number 1.

The spectacle frame 1 comprises a front piece 10. The latter is configured to retain and support lenses 11. In particular, the front piece 10 has a rear surface 10a configured to face the user when the spectacle frame 1 is properly worn by a user and an opposite front surface 10b.

In accordance with a preferred embodiment, the front piece 10 is made of polymeric material e.g. polyamide (PA), polysulphone (PESU, PSU), polyphenylsulphone (PPSU), polyetherimide (PEI) and filled polymeric materials. In this way, the polymeric material provides elasticity and durability to the front piece 10. Preferably, the front piece 10 is made by 3D moulding technology, by injection moulding or by CNC milling.

Advantageously, the use of 3D printing to make the front piece reduces production costs, and at the same time allows maintaining an elasticity of the material such as to facilitate the assembly phases of the frame itself.

In accordance with a preferred embodiment alternative to the previous one, the front piece 10 is made of metal, preferably a metal for 3D printing, a metal for metal injection molding (MIM), or a metal alloy that can be easily machined by milling. In this way, the metallic material improves the durability of the front piece 10.

In accordance with a preferred embodiment alternative to the previous ones, the front piece 10 is made of composite materials processed for example by 3D printing.

The spectacle frame 1 comprises a pair of temples 20. Each temple 20 extends between a first end portion 21, associated with and/or may be associated with the front piece 10, and a second end portion 22 that can be positioned on the ear of a user. Preferably, the temples 20 are reversibly coupled to the front piece 10 in order to facilitate their replacement and mounting.

In accordance with a preferred embodiment, the temples 20 are made of metal, preferably titanium or steel.

In accordance with an alternative embodiment, the temples 20 are made of polymeric materials e.g. polyamide (PA), polysulphone (PESU, PSU), polyphenylsulphone (PPSU), polyetherimide (PEI) or filled polymeric materials.

In accordance with a preferred embodiment alternative to the previous ones, the front piece 10 is made of composite materials processed for example by 3D printing.

The spectacle frame 1 comprises a pair of hinges 30 configured to rotationally bind each temple 20 to the front piece 10. Preferably, each hinge 30 is configured to connect a temple 20 to the front piece 10 such that each temple 20 can pass between a closed position, wherein the second end portion 22 is in proximity to the rear surface 10a of the front piece 10, and an open position, wherein the second end portion 22 is spaced from the rear surface 10a of the front piece 10 over a distance substantially equal to the distance between the first end portion 21 and the second end portion 22. More preferably, each temple 20 in the closed position describes an angle between the temple 20 and the front piece 10 substantially equal to 0°, while in the open position each temple 20 describes an angle between the temple 20 and the front piece 10 substantially equal to 90°. In accordance with preferred embodiments, the angle between the temple 20 and the front piece 10, in the open position, is in the region of 90°, while in the closed position the angle is in the region of 0°.

Each hinge 30 comprises a pin 40 extended along a development direction A-A between a first end 40a and a second end 40b. Preferably, each pin 40 is associated with a temple 20 as described below. In particular, the pin 40 is configured to act as a rotation axis around which the corresponding temple 20 rotates. In detail, the pin 40 has a side surface 47 extending between the first end 40a and the second end 40b and preferably having a cylindrical shape. In this way, the rotation of the corresponding temple 20 around the development axis A-A is facilitated as a result of the coupling between pin 40 and front piece 10.

In accordance with a preferred embodiment, the pin 40 is made of metallic material, preferably titanium or steel. Advantageously, as known from the state of the art, the choice of particular types of titanium and steel for making the pin and the temple respectively, or vice versa, favours self-lubrication by facilitating the rotation of the temple with respect to the pin. Advantageously, as known from the state of the art, the choice of particular types of steel for making the pin and the temple respectively, or vice versa, favours self-lubrication by facilitating the rotation of the temple with respect to the pin. In a further preferred embodiment, the pin 40 can be made of composite or ceramic materials. Alternatively, the pin 40 may be made of polymeric materials, preferably polyamide (PA), polysulfone (PESU, PSU), polyphenylsulfone (PPSU), polyetherimide (PEI) or filled polymeric materials.

In accordance with the present invention, the first end 40a and the second end 40b of the pin 40 are wedge-shaped. In particular, the wedge-shaped design facilitates the insertion of the pin 40 into the front piece 10 and the mutual engagement between pin 40 and front piece 10. Preferably, the first end 40a and the second end 40b of the pin 40 are wedge-shaped as illustrated in the figures.

Advantageously, the wedge-shaped design allows the pin 40 to be engaged correctly to the front piece 10. In addition, the engagement ensured by the shape of the ends 40a, 40b of the pin 40 prevents rotation of the pin 40 during the passage of the temple 20 between the open position and closed position and vice versa, and reduces the wear of the pin 40 and of the front piece 10 itself.

In particular, the first end 40a and the second end 40b of the pin 40 have a tapering 41, 42 along a tapering direction C-C perpendicular to the development direction A-A. Preferably, each tapering 41, 42 has a maximum point 41a, 42a and a minimum point 41b, 42b that are offset along the development axis A-A. More preferably, the maximum points 41a, 42a and the minimum points 41b, 42b are arranged in a symmetry plane Sim having the development direction A-A and the tapering direction C-C as directrices. It should be noted that the pin 40, along the development direction A-A, has a minimum height Hmin measured between the minimum points 41b, 42b and a maximum height Hmax measured between the maximum points 41a, 42a greater than the minimum height Hmin.

More preferably, the first end 40a and the second end 40b are symmetrical with respect to a transverse plane T to the pin and perpendicular to the symmetry plane Sim. In other words, the taperings 41, 42 are defined by tapering planes, inclined with respect to the transverse plane T, which cut the ends 40a, 40b of the pin 40. Specifically, the taperings 41, 42 are inclined at a non-zero angle with respect to the transverse plane T.

Advantageously, the taperings 41, 42 facilitate the insertion of the pin 40 into the front piece, as illustrated below, and allow a firm and durable engagement between the pin 40 and the front piece 10 itself.

In accordance with a preferred embodiment, the first end 40a and the second end 40b of the pin 40 have chamfers 43, 44, 45, 46 symmetrical with respect to a symmetry plane Sim defined by the development direction A-A and the tapering direction C-C. In particular, the chamfers 43, 44, 45, 46 are defined by cutting surfaces T1, T2, T3, T4 inclined with respect to the symmetry plane Sim and preferably also with respect to the transverse plane T. In other words, the cutting surfaces T1, T2, T3, T4 cut the ends 40a, 40b of the pin 40 by defining inclined planes having apexes on the symmetry plane Sim. In detail, the chamfers 43, 44, 45, 46 comprise first chamfers 43, 44, defined on the first end 40a, and second chamfers 45, 46 defined on the second end 40b. More in detail, the first chamfers 43, 44 and the second chamfers 45, 46 define respectively a first ridge 48 and a second ridge 49 on the symmetry plane Sim.

Preferably, the first ridge 48 and the second ridge 49 are inclined in accordance with the inclination of the respective taperings 41, 42. It should be noted that the first ridge 48 extends between the maximum point 41a and the minimum point 41b of the tapering 41, associated with the first end 40a, and the second ridge 49 extends between the maximum point 42a and the minimum point 42b of the tapering 42, associated with the second end 40b.

Advantageously, the chamfers 43, 44, 45, 46 facilitate the insertion of the pin 40 into the front piece and allow a firm and durable engagement between the pin 40 and the front piece 10.

Advantageously, the chamfers 43, 44, 45, 46 facilitate the angular orientation of the pin 40 around the development axis A-A during the insertion into the front piece 10.

Advantageously, a cooperation between the chamfers 43, 44, 45, 46 and the taperings 41, 42 improves the coupling between pin 40 and front piece 10.

The hinge 30 comprises coupling devices 50 associated with the first end portion 21 of each temple 20 and configured to engage the corresponding pin 40. In particular, the coupling devices 50 act on a portion of the pin 40, preferably on a portion of the side surface 47. In detail, the coupling devices 50 are configured to at least partially surround the side surface 47 so that the ends 40a, 40b are free to engage with the front piece 10. More specifically, as a result of the engagement between the coupling devices 50 and the pin 40, the ends 40a, 40b of the pin protrude along the development direction A-A from the coupling devices 50.

Preferably, the coupling devices 50 are configured to rotationally engage the pin 40, i.e., they are configured to allow the rotation of the temple 20 around the engaged pin 40.

In accordance with a preferred embodiment, the coupling devices 50 extend from the first end portion 21. Preferably, the coupling devices 50 are obtained as a piece near the first end portion 21 or bound thereto. More preferably, the coupling devices 50 comprise a hook 51 configured to engage the corresponding pin 40 and allow the rotation of the temple 20 with respect to the engaged pin 40. In detail, the hook 51 defines a through channel 51a configured to at least partially receive the pin 40 and surround it around the side surface 47. It should be noted that the through channel 51a is sized to allow the rotation around the pin 40 of the temple 20 without generating a sufficient frictional force to rotate the pin 40.

In accordance with an alternative preferred embodiment, the coupling devices 50 comprise a ring configured to engage the corresponding pin 40 and allow the rotation of the temple 20 with respect to the engaged pin 40. In detail, the ring defines a through channel configured to at least partially receive the pin 40 and surround it around the side surface 47. It should be noted that the through channel is sized so as to allow the rotation around the pin 40 of the temple 20 without generating a sufficient frictional force to rotate the pin 40. Preferably, the ring is obtained by welding a hook. In particular, the hook comprises a central body and a hooked end portion defining an open circle. The end portion is close to the central body and therefore free. Welding involves joining by closing the free end portion of the hook with its central body thus defining a closed ring. It should be noted that welding can be applied to plastic, metallic or composite materials in accordance with the compatibility characteristics of the materials themselves.

The hinge 30 comprises a cavity 60 located in the front piece 10 preferably configured to accommodate the pin 40 and the coupling devices 50. More preferably, the cavity 60 is configured to retain the pin 40 and allow the rotation of the temple 20 around the pin 40.

The cavity 60 comprises a first wall 70 and an opposite second wall 80 spaced along a spacing direction B-B. In accordance with the present invention, the spacing direction B-B is substantially parallel to the development direction A-A, upon insertion of the pin 40 within the cavity 60. The first wall 70 and the second wall 80 are configured to engage the first end 40a and the second end 40b respectively. Specifically, the first wall 70 and the second wall 80 are configured to guide the first end 40a and the second end 40b within the cavity 60 and retain the pin 40.

The cavity 60 comprises blocking devices 90 configured to engage the ends 40a, 40b of the pins 40, preferably to retain them. The blocking devices 90 are shaped to match the first end 40a and the second end 40b of the pin 40 to prevent the pin 40 from making rotational movements around the development axis A-A and translational movements with respect to the blocking devices 90, as a result of mutual engagement between the ends 40a, 40b of the pin 40 with the blocking devices 90.

Figure 5:
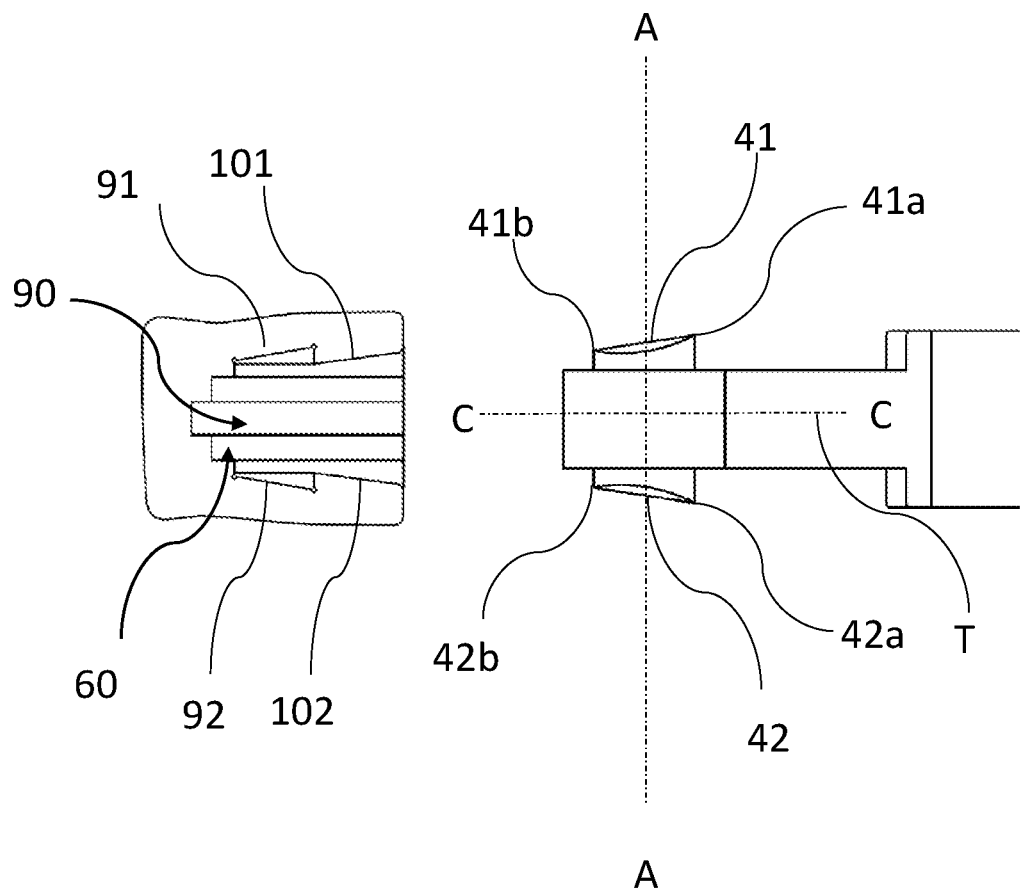
FIG. 5 shows a first schematic side view of a portion of the spectacle frame partially assembled in accordance with the embodiment of FIG. 1.
Figure 6:
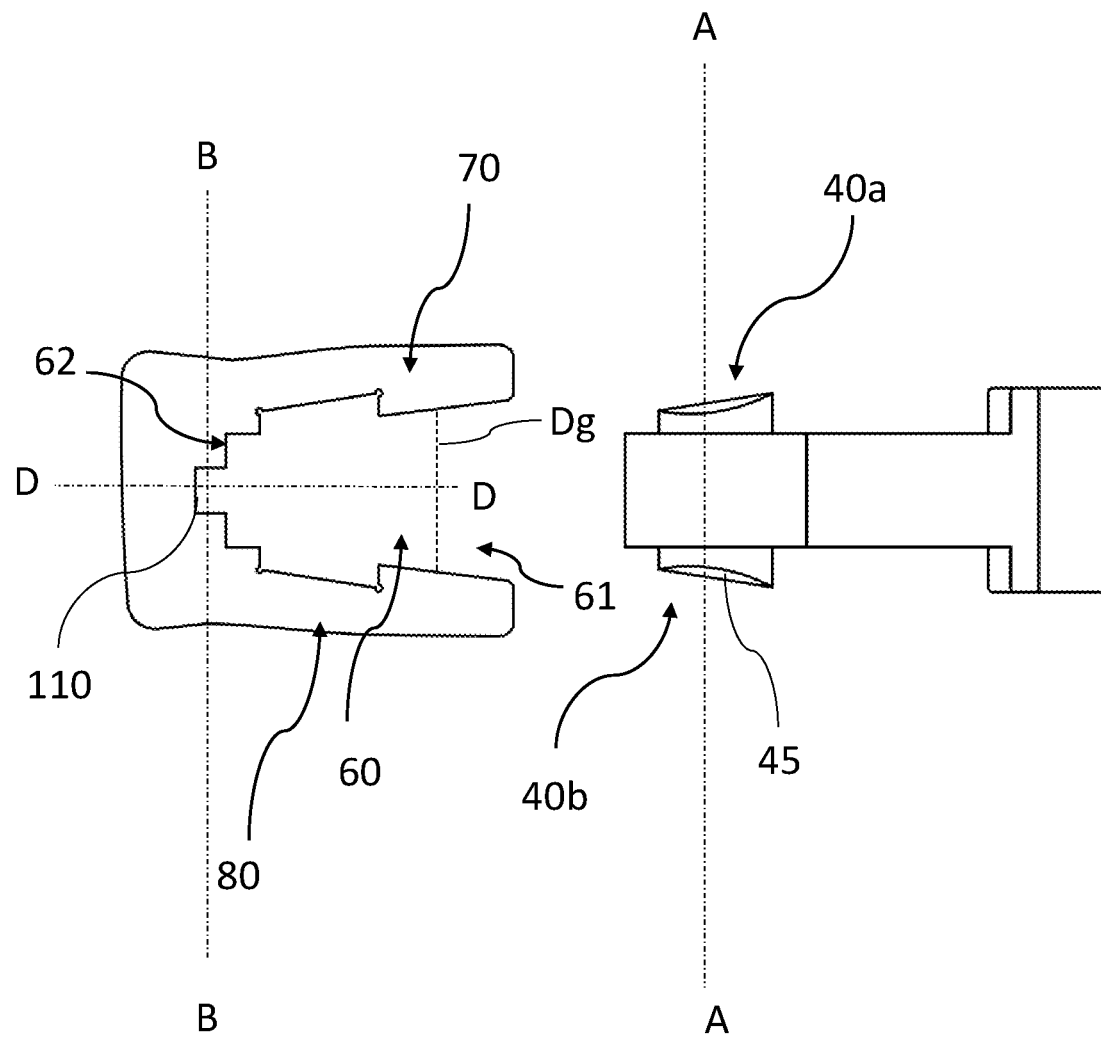
FIG. 6 shows a second schematic side view of a portion of the spectacle frame partially assembled in accordance with the embodiment of FIG. 1.
Figure 7:
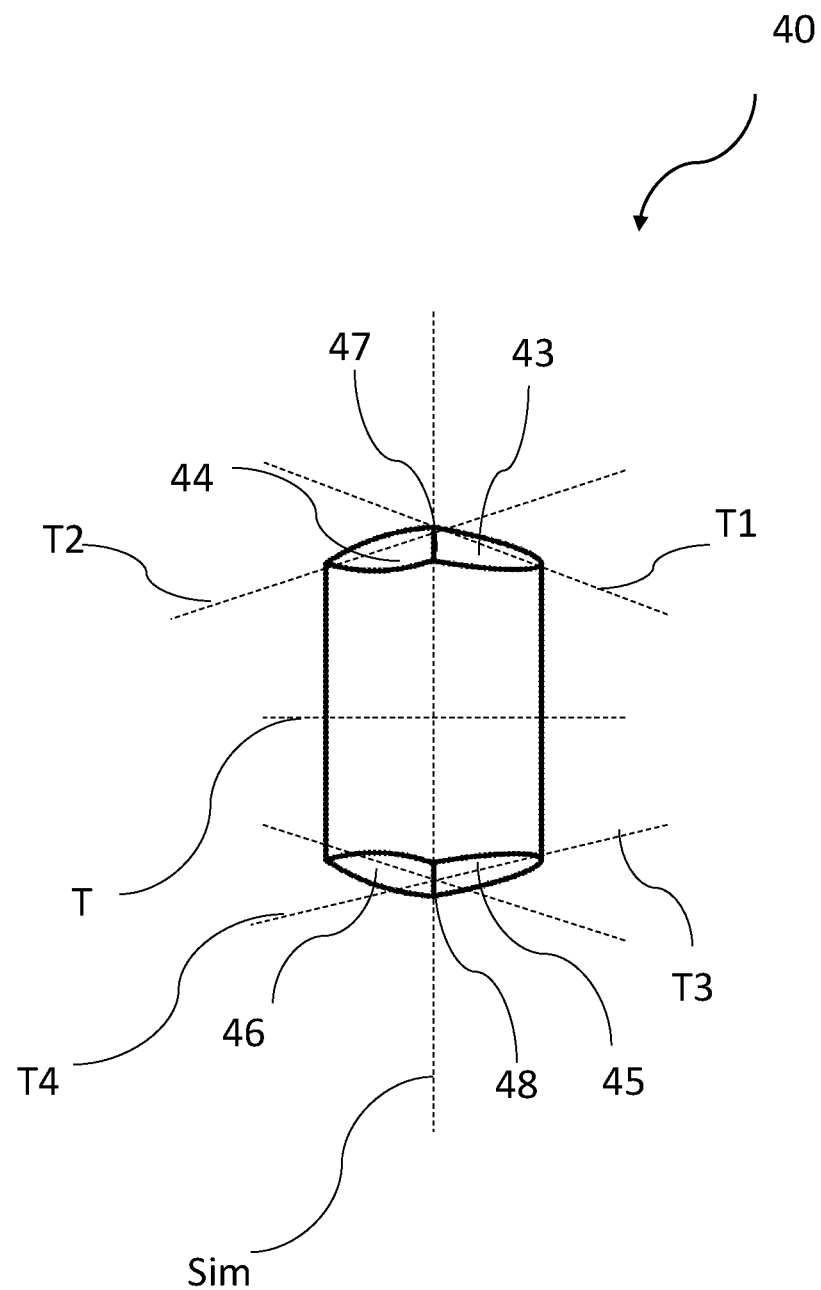
FIG. 7 shows a front view of a pin of the spectacle frame in accordance with the present invention.
Figure 8:
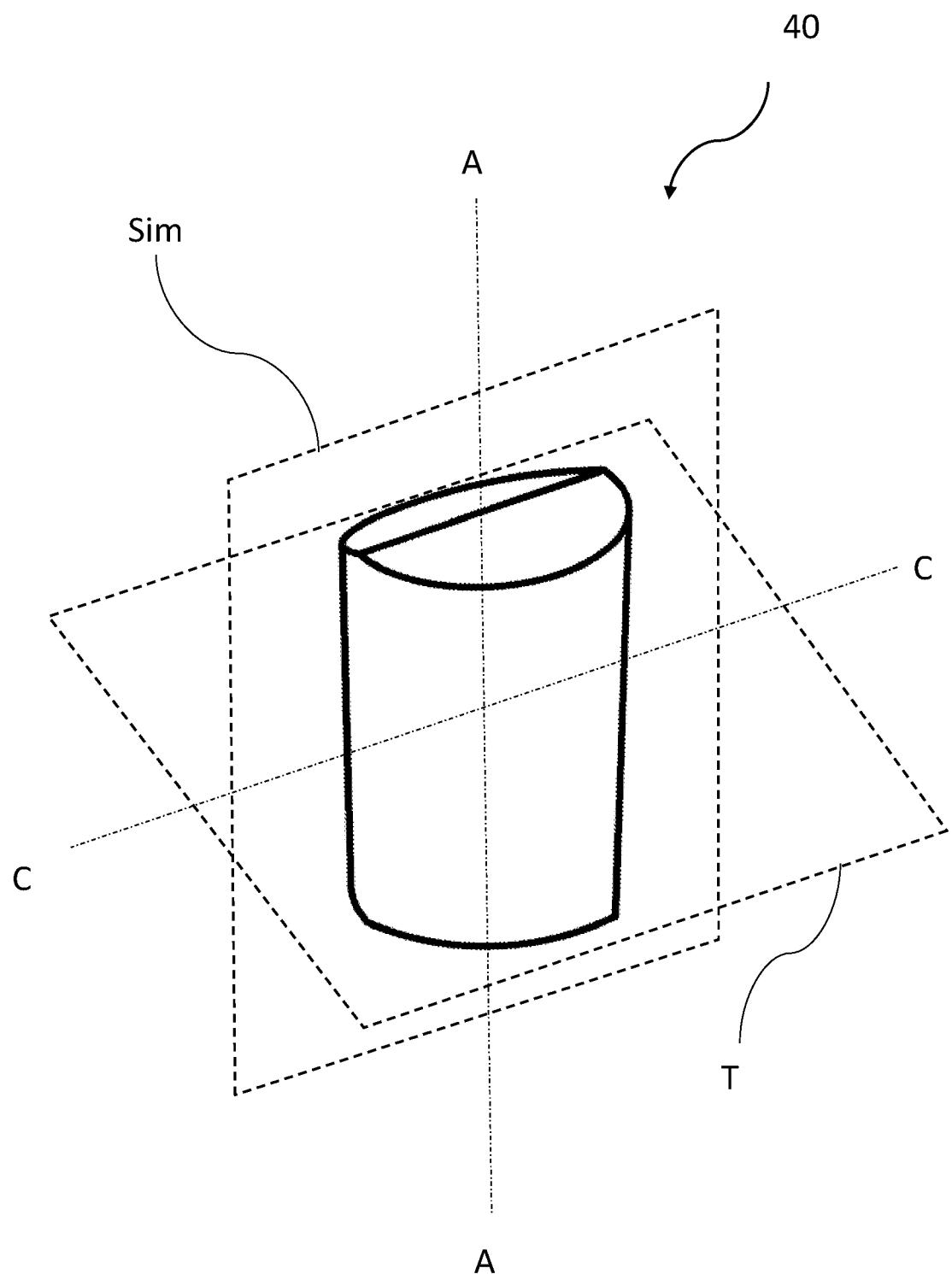
FIG. 8 shows a perspective view of the pin of FIG. 7.
Figure 9:
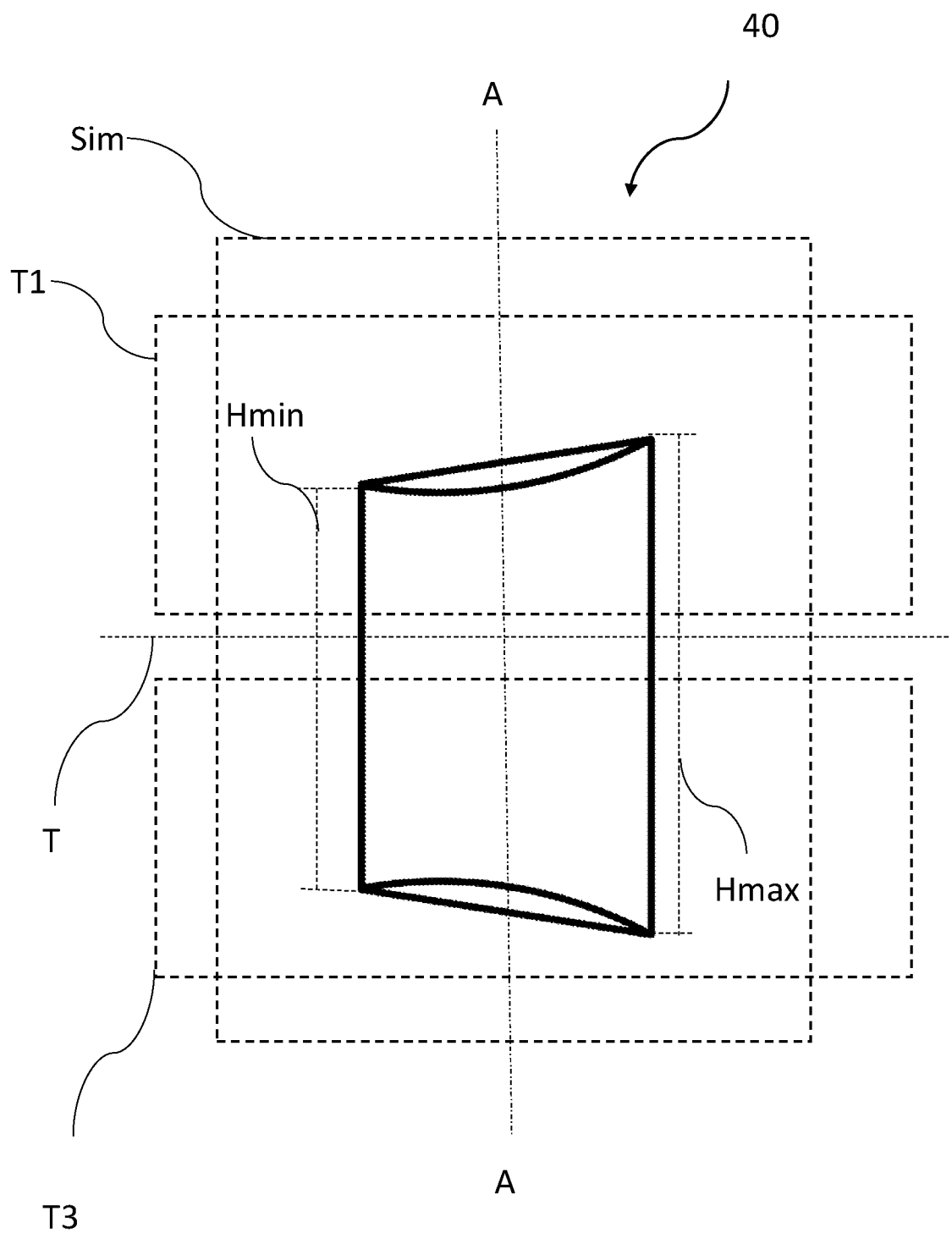
FIG. 9 shows a side view of the pin of FIG. 7.

Preferably, the blocking devices 90, as illustrated in FIGS. 5 and 6, comprise a first seat 91, defined on the first wall 70, and a second seat 92, defined on the second wall 80. Specifically, the first seat 91 and the second seat 92 are configured to engage and retain, respectively the first end 40a and the second end 40b of the pin 40. In detail, the pin 40 is snap-fitted into the first seat 91 and the second seat 92. In this way, the pin 40 is retained within the cavity 60. Preferably, the seats 91, 92 are sized to block the pin 40. More preferably, as a result of the engagement of the pin 40 with the corresponding seats 91, 92, the first wall 70 and the second wall 80 apply a compressive force along the development direction A-A so as to improve the tightness is of the pin 40.

More preferably, the first seat 91 and the second seat 92 are shaped to match the first end 40a and the second end 40b of the pin 40 respectively to prevent rotations of the pin 40 about the development axis A-A and translations of the pin 40 with respect to the first seat 91 and the second seat 92.

Thanks to the cooperation between the wedge-shaped ends 40a, 40b of the pin 40 and the blocking devices 90 that are shaped to match the ends 40a, 40b, the hinge 30 allows the pin 40 to be firmly engaged to the front piece 10 and the temples 20 to rotate around the pin 40 without corresponding movements of the pin 40 with respect to the seats 91, 92. In this way, the hinge 60 avoids damages to the front piece 10 due to movements of the pin 40 and thus avoids loosenings and wobblings of the temple 20 with respect to the pin 40 over time.

In accordance with a preferred embodiment, the hinge 60 comprises guiding devices 100, as illustrated in FIGS. 2-5, configured to guide the first end 40a and the second end 40b of the pin 40 in the cavity 60 up to the blocking devices 90. It should be noted that the guiding devices 100 are associated with the first wall 70 and the second wall 80 and are spaced along the spacing direction B-B.

Preferably, the guiding devices 100 and the ends of the pins 40a, 40b are conformed to induce a controlled spacing apart of the first wall 70 and of the second wall 80 along the spacing direction B-B until the ends 40a, 40b of the pin 40 are mutually engaged with the blocking devices 90.

In detail, the guiding devices 100, during insertion of the pin 40 within the cavity 60, are configured to engage the pin 40 in a portion comprised between the minimum points and the maximum points. In this way, as a result of insertion, the guiding devices 100 engage the taperings 41, 42 by gradually spacing the walls 70, 80 apart along the inclination of the taperings from the minimum points to the maximum points. It should be noted that the cooperation between the guiding devices 100 and the taperings 41, 42 reduce the force required by the user to deform the walls as well as facilitate the insertion of the pin 40 into the cavity 60.

More preferably, the guiding devices comprise a first guide 101, defined on the first wall 70, and a second guide 102 defined on the second wall 80. It should be noted that guides 101, 102 are spaced apart along the spacing direction B-B and placed at a distance Dg along the cavity 60 up to the blocking devices 90. For the purposes of the present invention, it should be noted that the distance Dg between the guides 101, 102 is comprised between the minimum height Hmin and the maximum height Hmax of the pin 40. In this way, when the pin 40 is inserted in the cavity 60, the walls 70, 80 are gradually spaced apart up to a distance equal to the maximum height Hmax. Preferably, the guides 101, 102 are inclined along the depth direction D-D such that their distance Dg near the opening is substantially equal to the maximum height Hmax and their distance Dg near the blocking devices 90 is substantially equal to the minimum height Hmin.

Specifically, the first guide 101 and the second guide 102 are shaped to match the first end 40a and the second end 40b of the pin 40 to guide the pin 40. Furthermore, the match-shaping of the guides 101, 102 allows the pin 40 to be oriented before the engagement with the blocking devices 90. Specifically, the guides 101, 102 have inclined surfaces in accordance with the chamfers 43, 44, 45, 46 of the pin and a junction line between the inclined surfaces which is configured to engage and guide the maximum points 41a, 42a. Furthermore, the guides 101, 102 thus defined, receiving the pin 40 allow the ends to be engaged and the pin 40 to rotate about the development axis A-A in such a way as to orient it correctly, that is, so that the maximum points 41a, 42a are aligned with the cavity 60 as well as with the guides 101, 102.

Advantageously, the first guide 101 and the second guide 102 facilitate the snap-fitting of the pin 40 into the seats 91, 92. In fact, the pin 40 is forced between the two guides 101, 102 which space apart the first wall 70 and the second wall 80 until the pin reaches the seats 91, 92 to be retained by interference between them.

In accordance with a preferred embodiment, the first wall 70 and the second wall 80 are configured to elastically deform by bending as the pin 40 passes through the cavity 60. In particular, the first wall 70 and the second wall 80, by bending, are configured to generate an elastic compressive force on the ends 40a, 40b of the pin 40 along the development direction A-A once the pin 40 is inserted inside the cavity 60. It should be noted that this compressive force is applied by the walls on the pin 40 until it reaches the blocking devices 90. The approach of the first wall 70 and the second wall 80 allows blocking the pin 40 in the seats.

In detail, the front piece 10 at least near the cavities 60 is made of a flexible and/or semi-flexible material so as to allow the first wall 70 and the second wall 80 to bend elastically by spacing apart under the application of a force by the pin 40 and, subsequently to bend elastically by approaching once the pin 40 has been blocked in the blocking devices 90. Preferably, the first wall 70 and the second wall 80 are configured to pass reversibly from an initial position in which the guides 101, 102 are placed at a distance Dg to a deformed position in which the guides 101, 102 are placed at a distance Hmax at the position of the pin 40 engaged with the guides 101, 102.

Advantageously, the elasticity of the walls 70, 80 allows inserting the pin 40 snap-fittingly in the cavity 60 and retaining it.

Preferably, the cavity 60 extends between an opening 61, configured to receive the coupling devices 50 and the pin 40, and a back wall 62 along a depth direction D-D perpendicular to the spacing direction B-B. It should be noted that the blocking devices 90 are obtained near the back wall 62.

In particular, the cavity 60 comprises two opposite side walls 63, 64 spaced along a width direction E-E perpendicular to the spacing direction B-B and to the is depth direction D-D. The side walls 63, 64 are configured together with the back wall 62 to connect the first wall 70 and the second wall 80. For the purposes of the present invention, the side walls 63, 64 comprise a first side wall 64 arranged on the lens side 11 and a second side wall 63 facing the first side wall 64. In particular, the second side wall 63 defines an abutment surface for the coupling devices 50 of the temple. In detail, the second side wall 63 limits the rotation of the temple 20 about the pin 40 so that a portion of the coupling devices 50 abuts against the wall 63 itself when the temple 20 is in the open position. Even more in detail, the coupling devices 50 comprise an abutment portion 52 which by cooperating with the second side wall 63 limits the rotation of the temple 20. Preferably, said abutment portion extends from the first end portion 21 of the temple 20 and connects the hook 51 to the first end portion 21.

In accordance with a preferred embodiment, the cavity 60 comprises a groove 110 defined on the side walls 63, 64 and on the back wall 62. Said groove 110 is configured to cooperate with the guiding devices 100 and the pin 40 to mutually space apart the first wall 70 and the second wall 80. Specifically, the groove 110 facilitates the mutual spacing apart of the first wall 70 and the second wall 80 when inserting the pin 40 into the cavity.

Advantageously, the groove 110 allows the hinge 30 to be adapted to metal and/or polymer front pieces 10 as well as to metal and/or polymeric pins 40.

Advantageously, the groove 110 improves the flexibility of the first wall 70 and of the second wall 80 when inserting the pin 40 into the cavity.

Advantageously, the groove 110 therefore exploits the natural elasticity and deformability of the material and in the case of stiffer materials facilitates the spacing apart of the first wall 70 and of the second wall 80.

Figure 10:
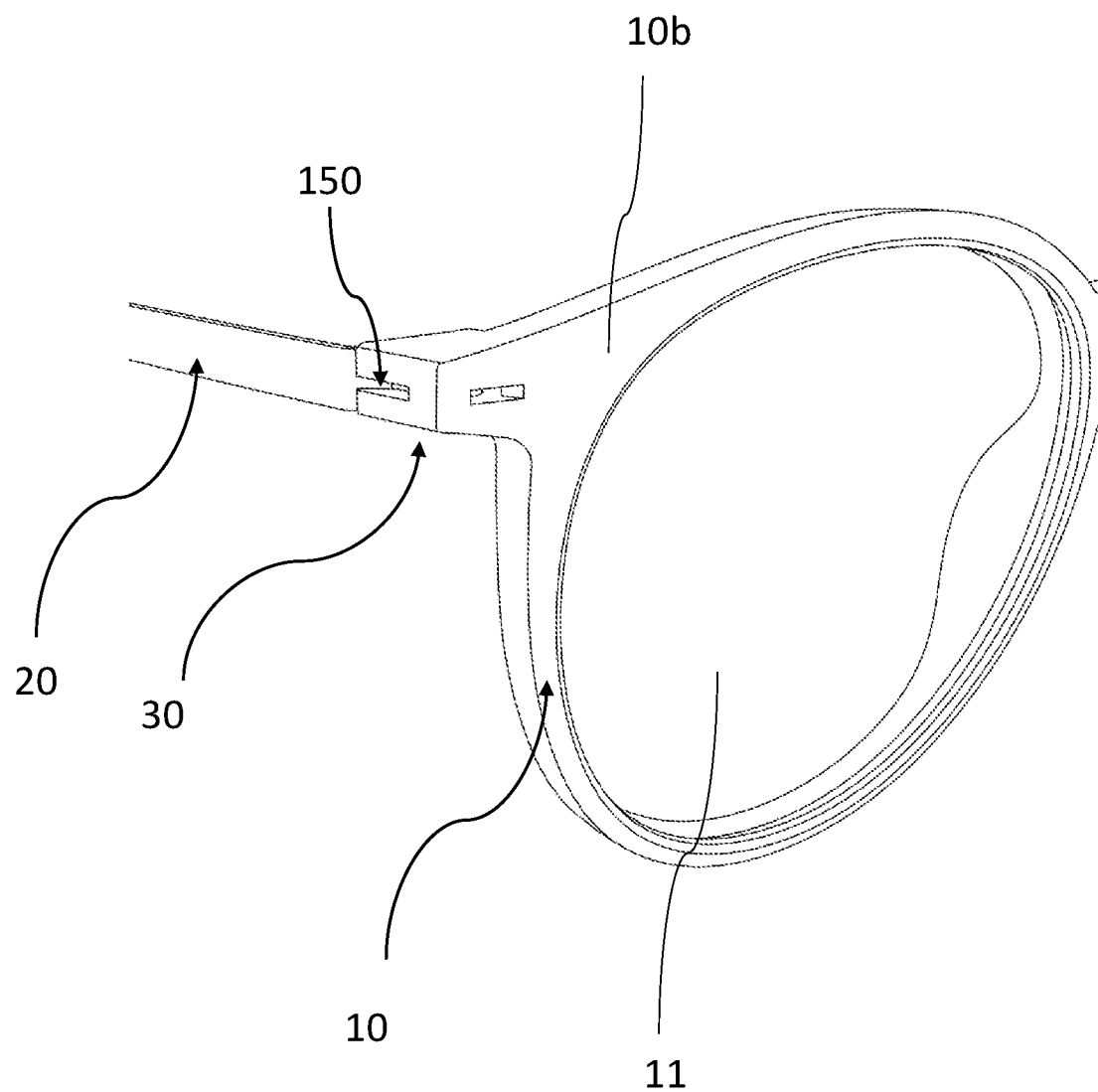
FIG. 10 shows a perspective view of a portion of the spectacle frame in accordance with a second embodiment of the present invention.
Figure 11:
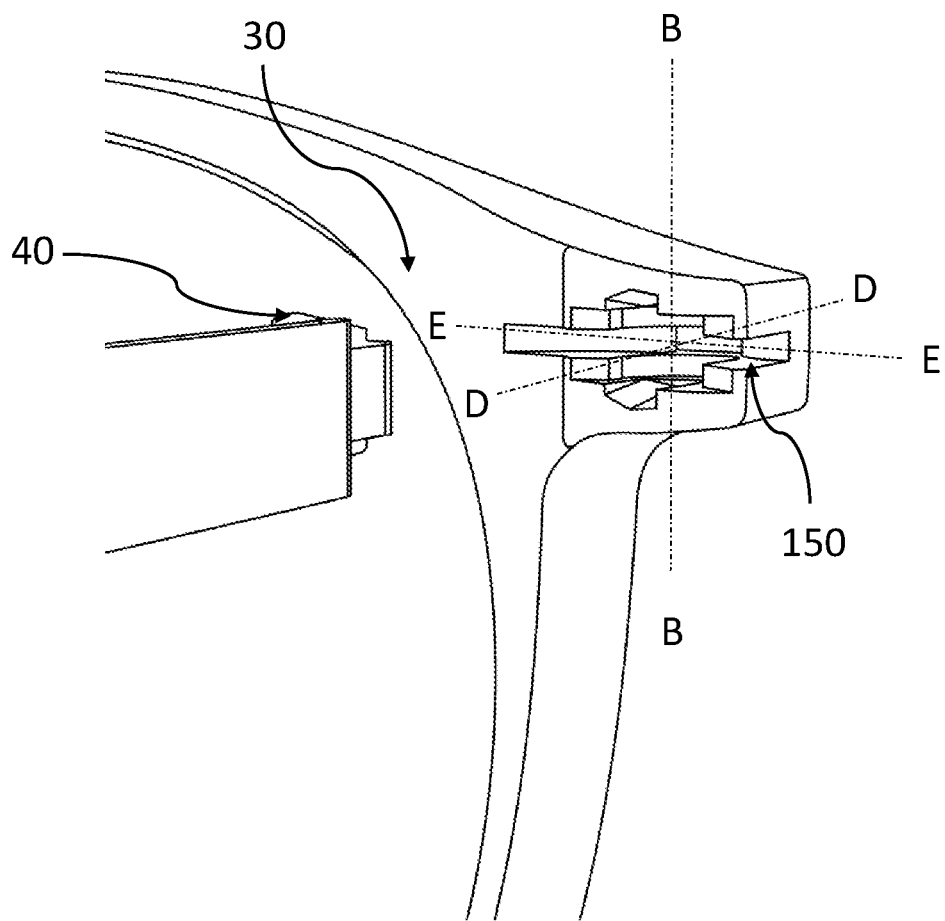
FIG. 11 shows a perspective view of a portion of the spectacle frame partially assembled in accordance with the embodiment of FIG. 10.

In accordance with a preferred embodiment illustrated in FIGS. 10 and 11, the spectacle frame comprises a first through cut 150 obtained on the second side wall 63. Specifically, the first through cut 150 separates the first wall 70 and the second wall 80 at the second side wall 63, preferably along the second side wall 63. In detail, the first through cut 150 facilitates the bending of the first wall 70 and of the second wall 80 during the insertion of the pin 40 into the cavity 60, in accordance with what has been described above. In particular, the first through cut 150 is configured to cooperate with the guiding devices 100 and the pin 40 to mutually space apart the first wall 70 and the second wall 80. Advantageously, the first through cut 150 allows the hinge 30 to be adapted to front pieces 10 made of not very flexible materials such as metal.

Figure 12:
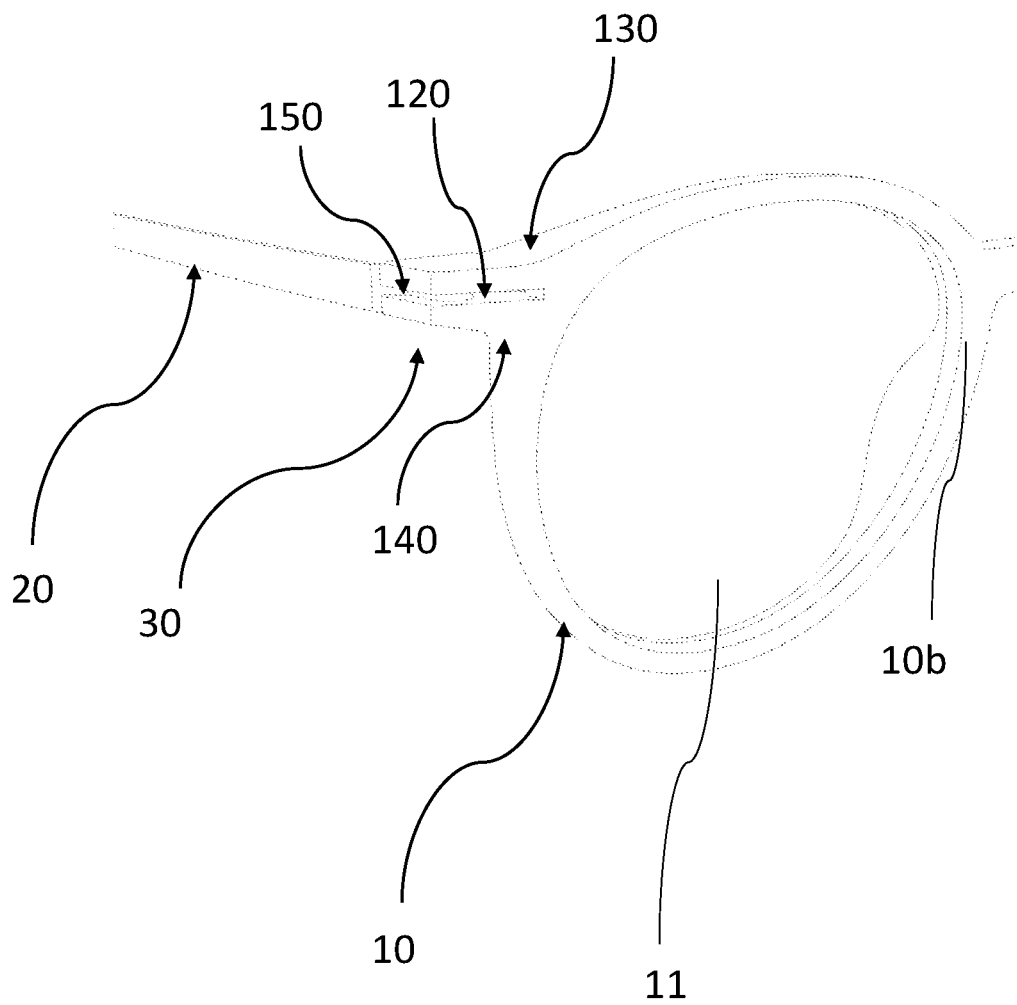
FIG. 12 shows a perspective view of a portion of the spectacle frame in accordance with a third embodiment of the present invention.
Figure 13:
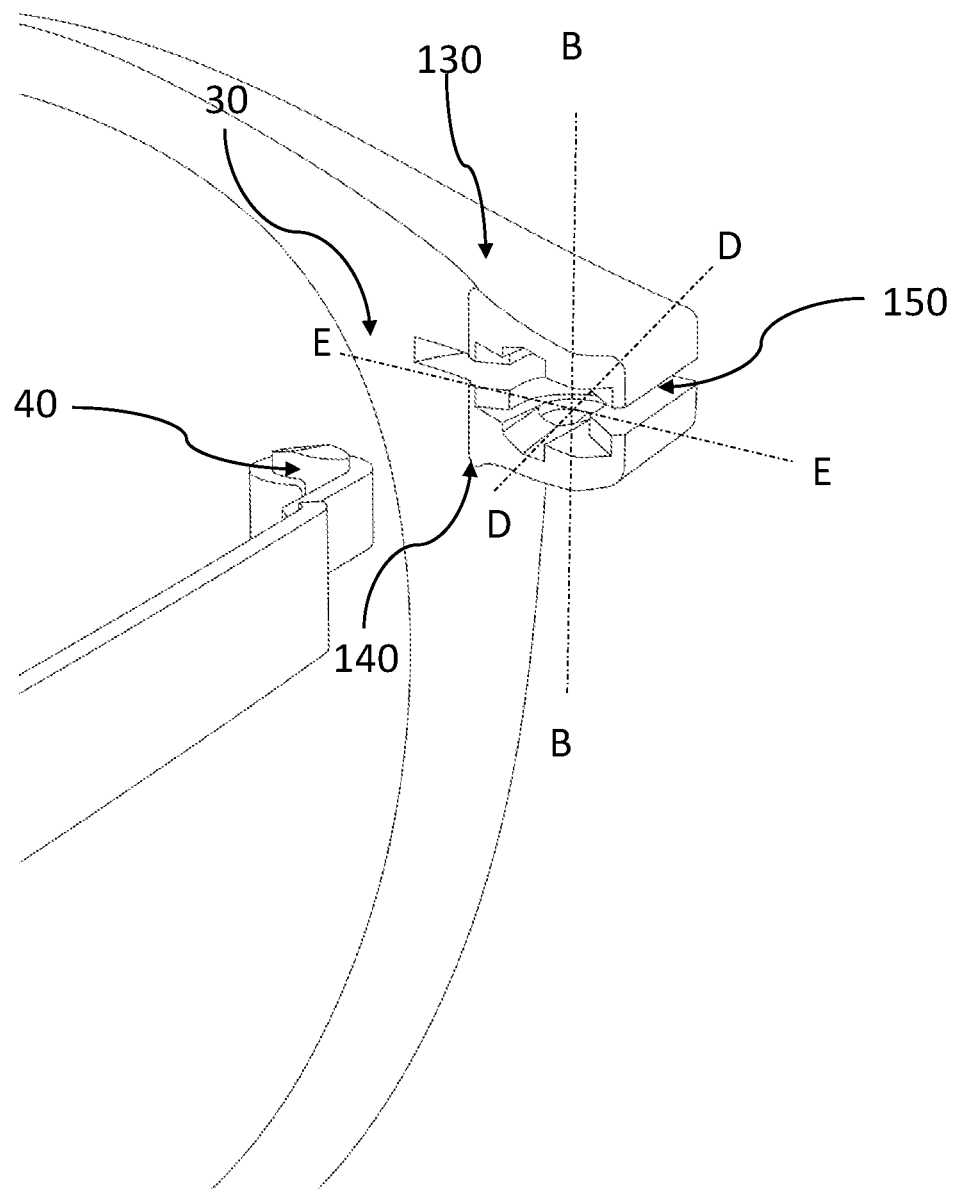
FIG. 13 shows a perspective view of a portion of the spectacle frame partially assembled in accordance with the embodiment of FIG. 12.
Figure 14:
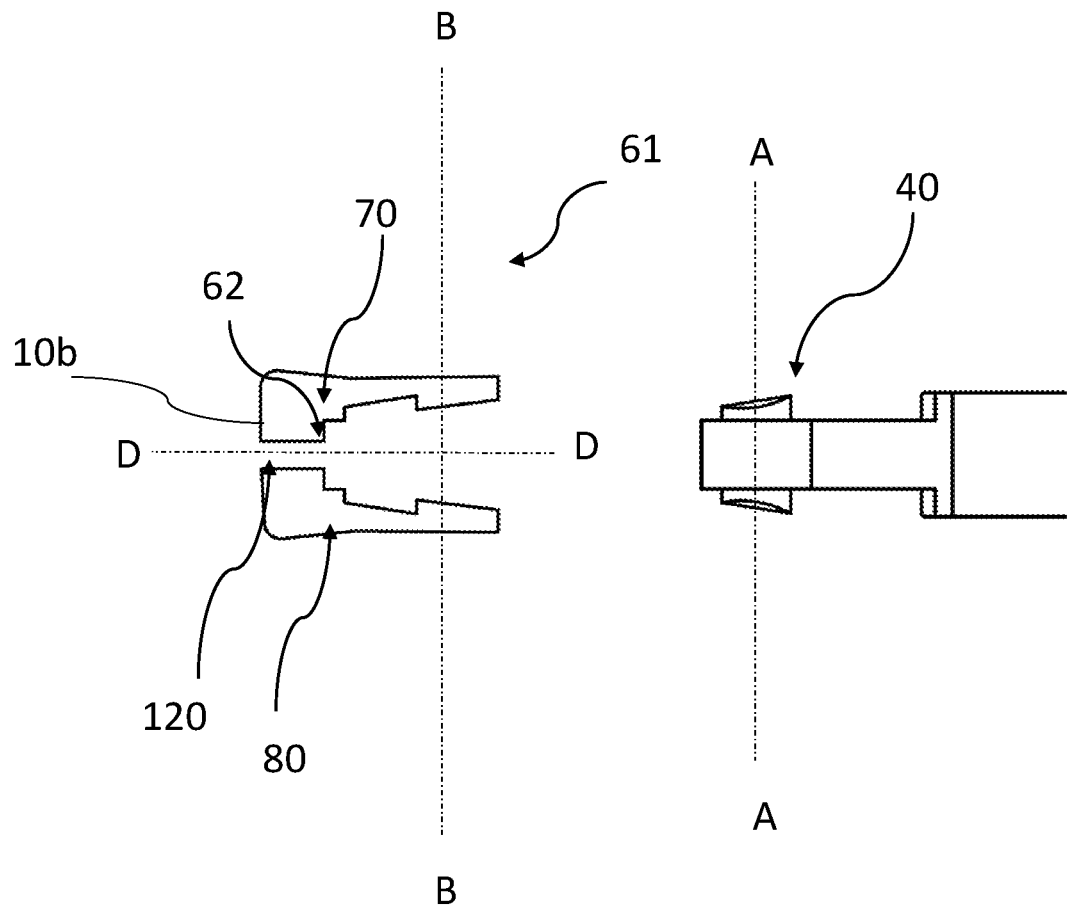
FIG. 14 shows a schematic side view of a portion of the spectacle frame partially assembled in accordance with the embodiment of FIG. 12.

In accordance with a preferred embodiment illustrated in FIGS. 12-14, the spectacle frame 1 comprises a first through cut 150 and a second through cut 120. Specifically, the second through cut 120 separates the first wall 70 and the second wall 80 at the back wall 62. In detail, the combination of the first through cut 150 and the second through cut 120 allows the development of the first wall 70 and the second wall 80 in a cantilevered manner from the frame preferably from the first side wall 64. In other words, the first wall 70 and the second wall 80 are made so that they are connected to the front piece 10 by means of respective junction zones 130, 140. Preferably, the first wall 70 and the second wall 80 are obtained as a single piece from the front piece 10.

The combination of the first through cut 150 and the second through cut 120 facilitates the bending of the first wall 70 and of the second wall 80 during insertion of the pin 40 into the cavity 60, in accordance with what has been described above. In to particular, the first through cut 150 and the second through cut 120 are configured to cooperate with the guiding devices 100 and the pin 40 to mutually space apart the first wall 70 and the second wall 80. Advantageously, the first through cut 150 and the second through cut 120 allow the hinge 30 to be adapted to front pieces 10 made of not very flexible materials such as metal.

In accordance with a preferred embodiment, the spectacle frame 1 comprises disassembly devices configured to facilitate the spacing apart of the first wall 70 and of the second wall 80 and to allow the extraction of the pin 40 from the blocking devices 90.

In the following, a method for assembling the spectacle frame 1 object of the present invention will be described. The method includes providing the front piece 10, the pair of temples 20 and the pair of pins 40. Then, the method comprises the step of coupling the coupling devices 50 of a temple 20 with a pin 40. In particular, the step of coupling a temple 20 with a pin 40 comprises inserting the pin 40 inside the through channel 51a and orienting, even in a rough way, the minimum points 41a, 42a of the pin towards the opening of the cavity 60. In this way, the taperings 41, 42 are oriented to gradually space the first wall 70 and the second wall 80 apart.

Thereafter, the assembly method includes the step of inserting the pin 40 together with the coupling devices 50 into the cavity 60 along the depth direction D-D. It should be noted that upon engagement between the pin 40 with the first wall 70 and with the second wall 80, the pin 40 cooperates with the guiding devices 100 to space apart the first wall 70 and the second wall 80 respectively and to angularly correct any undesirable rotations of the pin 40. In particular, the insertion force applied by a user or by a machine to the pin 40 during the insertion step causes the elastic bending of the first wall 70 and of the second wall 80. Specifically, the pin 40 during insertion generates a force along the development direction A-A which mutually space apart the walls 70, 80. When the blocking devices 90 are reached, the ends of the pin 40 engage with the respective seats 91, 92 and the force applied on the first wall 70 and the second wall 80 ceases. Therefore, once the blocking devices 90 have been reached, the walls bend again by approaching, thus allowing the pin 40 to be blocked snap-fittingly between the seats 91, 92. The method subsequently provides for repeating the pin-temple coupling and insertion steps for the remaining temple and the remaining pin.

The invention claimed is:

1. Spectacle frame comprising:
   a front piece;
   a pair of temples, each temple extending between a first end portion associated with the front piece and a second end portion that can be positioned on the ear of a user;
   a pair of hinges configured to rotationally bind each temple to the front piece, each hinge comprising:
      a pin extended along a direction of development between a first end and a second end,
      coupling devices associated with the first end portion of each temple and configured to engage the corresponding pin;
      a cavity located in the front piece, the cavity comprising
         a first wall and an opposite second wall spaced along a spacing direction; and
         blocking devices configured to engage the ends of the pins, the blocking devices being shaped to match the first end and the second end of the pin to prevent the pin from making rotational movements around the development axis and translational movements with respect to the blocking devices as a result of mutual engagement between the ends of the pin with the blocking devices;
   characterised in that:
      the first end and the second end of the pin are wedge-shaped taper in the same direction.

2. The spectacle frame according to claim 1, wherein the first end and the second end of the pin have a tapering along a tapering direction perpendicular to the direction of development.

3. The spectacle frame according to claim 2, wherein the first end and the second end of the pin have chamfers symmetrical with respect to a symmetry plane defined by the development direction and the tapering direction, the chamfers being defined by cutting surfaces inclined with respect to the symmetry plane.

4. The spectacle frame according to claim 1, wherein blocking devices comprise:
   a first seat defined on the first wall;
   a second seat defined on the second wall;
   the first seat and the second seat are configured to engage and retain, respectively the first end and the second end of the pin.

5. The spectacle frame in accordance with claim 4, wherein the first seat and the second seat are shaped to match the first end and the second end of the pin is respectively to prevent pin rotations about the development axis and pin translations with respect to the first seat and the second seat.

6. The spectacle frame according to claim 1, wherein the hinge comprises guiding devices configured to guide the first end and the second end of the pin in the cavity up to the blocking devices.

7. The spectacle frame according to claim 6, wherein the guiding devices and the ends of the pins are conformed to induce a controlled spacing apart of the first wall and of the second wall along the spacing direction until the ends of the pin are mutually engaged with the blocking devices.

8. The spectacle frame according to claim 6, wherein the guiding devices comprise:
 a first slide defined on the first wall;
 a second slide defined on the second wall;
 the first slide and the second slide being shaped to match the first end and the second end of the pin to guide the pin and orient the pin before engagement with the blocking devices.

9. The spectacle frame according to claim 1, wherein the cavity extends between an opening, configured to receive the coupling devices and the pin, and a back wall along a depth direction perpendicular to the spacing direction, the cavity comprising a first to side wall and an opposing second side wall spaced along a width direction perpendicular to the spacing direction and to the depth direction and configured together with the back wall to connect the first wall and the second wall.

10. The spectacle frame according to claim 9, wherein the cavity comprises:
 a groove defined on the side wall and the back wall, the groove being configured to cooperate with the guiding devices and the pin to mutually space apart the first wall and the second wall; or alternatively
 a first through cut configured to separate the first wall and the second wall at the second side wall and to cooperate with the guiding devices and the pin to mutually space apart the first wall and the second wall, or alternatively
 a first through cut and a second through cut configured to separate the first wall and the second wall at the second side wall and the end wall respectively, the first through cut and the second through cut being configured to cooperate with the guiding devices and the pin to mutually space apart the first wall and the second wall.

* * * * *